(12) United States Patent
Ramakrishnan

(10) Patent No.: US 9,467,527 B2
(45) Date of Patent: Oct. 11, 2016

(54) RADIO ACCESS NETWORK CACHE

(71) Applicant: VidScale, Inc., Cambridge, MA (US)

(72) Inventor: Krishnan Ramakrishnan, Hopkinton, MA (US)

(73) Assignee: Vidscale, Inc., Cambridge, MA (US)

( * ) Notice: Subject to any disclaimer, the term of this patent is extended or adjusted under 35 U.S.C. 154(b) by 75 days.

(21) Appl. No.: 14/242,173

(22) Filed: Apr. 1, 2014

(65) Prior Publication Data
US 2014/0293875 A1 Oct. 2, 2014

Related U.S. Application Data

(60) Provisional application No. 61/807,529, filed on Apr. 2, 2013.

(51) Int. Cl.
*H04L 29/08* (2006.01)
*H04L 29/06* (2006.01)
*H04W 4/18* (2009.01)

(52) U.S. Cl.
CPC ....... *H04L 67/2842* (2013.01); *H04L 63/0227* (2013.01); *H04L 63/304* (2013.01); *H04L 67/2852* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 6,549,773 B1 * | 4/2003 | Linden | H04L 29/06 370/328 |
| 8,111,630 B2 | 2/2012 | Kovvali et al. | |
| 8,208,430 B2 | 6/2012 | Valmikam et al. | |
| 2010/0325303 A1 * | 12/2010 | Wang | G06Q 30/06 709/231 |
| 2011/0202634 A1 | 8/2011 | Kovvali et al. | |
| 2012/0099533 A1 | 4/2012 | Kovvali et al. | |
| 2012/0297009 A1 * | 11/2012 | Amir | H04L 12/66 709/213 |
| 2013/0077597 A1 | 3/2013 | Nukala et al. | |

FOREIGN PATENT DOCUMENTS

| | | |
|---|---|---|
| EP | 0 924 630 | 6/1999 |
| WO | WO 2012/140135 | 10/2012 |

OTHER PUBLICATIONS

Ericsson, "Registration and Profile Transfer Message Flows", 3rd Generation Partnership Project Drafting Meeting, Sophia-Antipolis, France; Jun. 12-14, 2000, 10 pages.
S. Harhalakis, "Header Request for HTTP", Network Working Group Internet-Draft, TEI of Thessaloniki Aug. 1, 2007, 13 pages.
Notification of Transmittal of the International Search Report and Written Opinion of the ISA date of mailing Jun. 16, 2014 corresponding to International Appl. No. PCT/US2014/032494, 1 page.
International Search Report and Written Opinion of the ISA dated Jun. 5, 2014 (mailing date Jun. 16, 2014) corresponding to International Appl. No. PCT/US2014/032494, 13 pages.
PCT International Preliminary Report dated Oct. 15, 2015 corresponding to International Application No. PCT/US2014/032494; 9 Pages.

* cited by examiner

*Primary Examiner* — Thai Nguyen
(74) *Attorney, Agent, or Firm* — Daly, Crowley, Mofford & Durkee, LLP

(57) ABSTRACT

A caching module is provided at the interface between a radio access network (RAN) and a core network (CN). If the requested content is available in the caching module as cached content, the caching module sends a header request upstream to an origin server to determine if the cached content is valid and authorized. If the cached content is invalid, it is evicted from the cached and may be replaced with a new, valid content. The CN can inspect the header response to perform data accounting and billing, to provide upstream content filtering, and to provide lawful interception capabilities. Related techniques are also provided.

20 Claims, 3 Drawing Sheets

ı

RADIO ACCESS NETWORK CACHE

CROSS REFERENCE TO RELATED APPLICATIONS

This application claims the benefit under 35 U.S.C. §119 (e) of U.S. Provisional Application No. 61/807,529 filed Apr. 2, 2013, which application is incorporated herein by reference in its entirety.

BACKGROUND

As is known in the art, mobile networks provide broadband Internet access to millions of subscribers. In a common architecture, such as used within 3G/UTMS networks and 4G/LTE networks, a subscriber wirelessly connects to a radio access network (RAN) which is connected to the Internet via a core network (CN). Mobile networks typically use caching to provide fast and efficient content delivery to subscribers, while reducing workload within the network. Traditionally, a content cache is provided at the interface of the CN and the Internet.

It has been appreciated that locating a cache at the interface of the CN and the Internet has several drawbacks. For example, caching in the CN does not reduce traffic in the RAN and thus does not reduce capital expenditures (CapEx) within the RAN, typically the most expensive part of a mobile network. In addition, the cache functionality is significantly distant from subscribers and does not help reduce congestion within the RAN, which is known to be the most expensive part of the network. Furthermore, locating a cache remote from the user will not have a beneficial impact on the Quality of Experience (QoE). Thus, it would be desirable to locate a content cache at the interface at the RAN.

SUMMARY

It is appreciated herein that locating a content cache at a radio access network (RAN) can be disruptive to the mobile network's service plane. For example, in 3G networks, data accounting (i.e., computing the amount of a data each subscriber consumes) is typically performed within a core network (CN) gateway node. If caching occurs downstream, within the RAN, the gateway node is unaware of the total number of bytes serviced by the cache and thus could not correctly account for data usage. In addition, legally authorized electronic surveillance, typically referred to as lawful interception, is also typically performed within the CN, either at a serving node or at a gateway node. An alternate solution for lawful interception needs to be determined when content is delivered from a downstream cache. Moreover, content filter (i.e., preventing access to certain content for certain groups of users, such as children) is also typically implemented within the CN. One solution is to relocate these service plane functions (i.e., data accounting, lawful interception, and/or content filtering) to the RAN, however this increases both implementation costs within the RAN as well as long-term operational costs. Alternatively, a custom, expensive integration effort is required between the RAN cache and various components of the CN, such as a Billing and Charging server, a lawful interception system, or a content filtering system.

Described herein is a method and system for caching content in a RAN without disrupting a mobile network's service plane and without requiring custom integration with a CN (i.e., the cache is transparent to the upstream network).

In one exemplary embodiment, in which a caching module is disposed at an interface between a radio access network (RAN) and a core network (CN), a method comprises receiving a content request to retrieve content from an origin server; determining if the requested content is available in the caching module as cached content; sending a header request to the origin server in response to sending the header request, receiving a header response; comparing information associated with the cached content with at least some information in a header present in the header response to determine whether the cached content is valid; and in response to the cached content being valid, sending a content response comprising the cached content.

In some embodiments, the content request includes a resource locator to identify the requested content. In some embodiments, the header request includes the resource locator. In some embodiments, the header response includes one or more headers.

In some embodiments, the method further comprises using the resource locator to determine if the content is available in the caching module as cached content, wherein sending a header request to the origin server is performed if the cached content is available in the caching module. In an exemplary embodiment, the method further comprises, in response to the cached content being valid, combining (e.g., by grafting or otherwise incorporating) one or more headers present in the header response with the cached content to form the content response. The method may further comprise, in response to the cached content being invalid, removing the cached content from the caching module, retrieving valid content from the origin server, and storing the valid content in the caching module.

In some embodiments, the content request is a Hypertext Transfer Protocol (HTTP) GET request and the header request is an HTTP HEAD request. In embodiments, comparing information associated with the content in the caching module comprises comparing at least one of the following HTTP headers: "Age," "Cache-Control," "Content-Length," "Content-Type," "Expires," "Last-Modified," and "Vary." The method may further comprise evicting the cached object from the memory if the header response comprises an HTTP status code greater than or equal to 400 and less than 500.

In some embodiments, a header present in the header response may correspond to the content size, wherein, in response to the header response traversing a gateway in the CN, the gateway can use the content size to account for the content size that will be delivered from the caching module once the header response is received by the caching module. In some embodiments, the header response may traverse a content filtering system to determine if the user is authorized to access the requested content. In response to a user not being authorized to access the requested content, the caching module does not provide the requested content. In some embodiments, the header response may include information to allow the lawful interception as the header response traverse the CN, to monitor content requests initiated by a user over a predetermined time period. Thus, it should be appreciated that the method described herein provides caching in a RAN without disrupting service plane functions of the CN.

The present disclosure further provides computer system disposed at an interface between a radio access network (RAN) and a core network (CN) comprising a memory and a caching module. The caching module is configured to perform one of the methods described hereinabove. In some embodiments, the caching module is collocated with a cellular base transceiver station or a controller controlling multiple base transceiver stations.

BRIEF DESCRIPTION OF THE DRAWINGS

Various embodiments of the concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, principles, systems, and techniques sought to be protected herein.

DETAILED DESCRIPTION

Before describing exemplary embodiments of the concepts, structures, and techniques sought to be protected herein, some introductory terms used in conjunction with the exemplary embodiments are explained. As used herein, the term "module" encompasses elements which may be implemented in either hardware (e.g., circuits, circuit elements and circuit components), software (e.g., computer coded being executed by a processor), and/or firmware or which may be implemented with any combination of hardware, software and/or firmware.

As used herein, the terms "mobile data network" and "mobile network" refer to any network that provides access to an external packet switched network (e.g., the Internet) using mobile devices, including mobile phones, laptop computers, and tablet computers. The term "subscriber" refers to both a mobile network user and a mobile device used by a mobile user. As used herein, the term "3G" generally refers to any third generation mobile telecommunications technology, including systems based on Universal Mobile Telecommunications System (UMTS) and, in some respects, Enhanced Data rates for GSM Evolution (EDGE) systems. The term "4G" is used herein to generally refer to any fourth generation mobile telecommunications technology, including Long Term Evolution (LTE) and Worldwide Interoperability for Microwave Access (WiMAX) systems. It will be understood that the systems and techniques described herein are not limited to any specific types of mobile technologies or generations thereof.

Reference will be made throughout to Hypertext Transfer Protocol (HTTP), which is a network protocol described in request for comment (RFC) 2616. This and related RFCs are published by the Internet Engineering Task Force (IETF) and available on its website (http://www.ietf.org) and are incorporated herein by reference in their entirety. The term "HTTP GET request" refers to an HTTP request having the method "GET" and the term "HTTP HEAD request" refers to an HTTP request having the method "HEAD." The term "header" refers to information other than content included within a request or response. A header typically includes a unique name and a corresponding value. RFC 2616, incorporated herein, defines certain headers that are commonly used within HTTP requests and responses.

Figure 1:
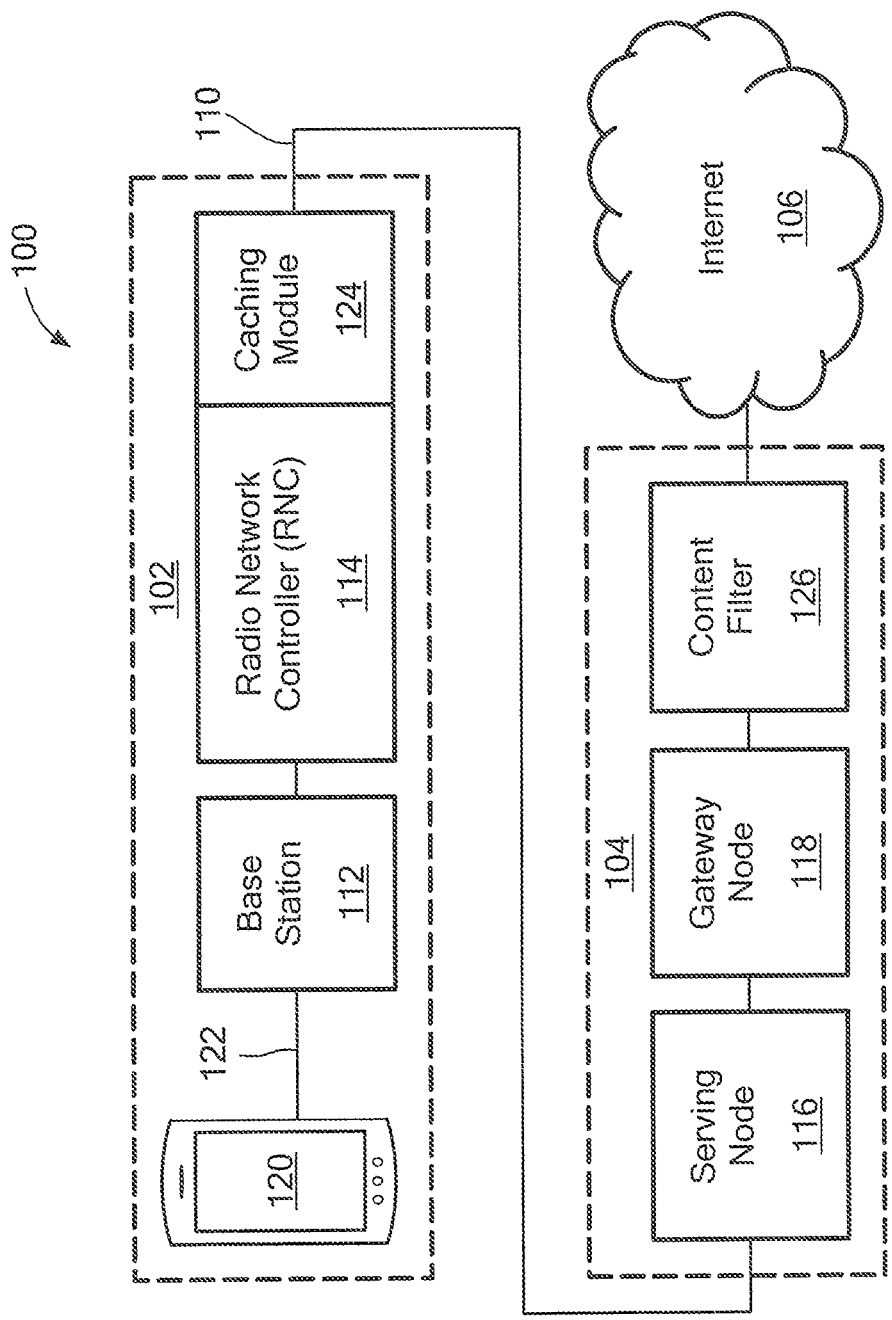
FIG. 1 is a block diagram of an exemplary mobile network having a caching module located at the interface of a radio access network (RAN) and a core network (CN)

Referring to FIG. 1, an exemplary mobile network 100 uses the radio access network (RAN) caching systems and techniques sought to be protected herein. The network 100 can be understood as having three sub-networks: a RAN 102, a core network (CN) 104, and an external packet switched network 106 (e.g., the Internet). In the exemplary embodiment shown, the RAN 102 includes one or more subscribers 120, one or more base transceiver stations (referred to simply as "base stations") 112, and one or more radio network controllers (RNCs) 114. In some embodiments, a base station 112 and an RNC 114 are collocated at a so-called "mobility station." As those skilled the art will appreciate, 4G/LTE mobile networks include an "eNodeB" component which general performs the combined functions of a base station and an RNC; thus the separate component RNC 114 may be excluded in some embodiments. For simplicity, FIG. 1 shows one subscriber and one mobility station, however it will be appreciated that a typical RAN includes many subscribers connected to many mobility stations in a many-to-many topology; the concepts and techniques described herein are applicable to any size mobile networks.

The various components of the network 100 are coupled by any suitable configuration of wireless and/or wireline communication links, which are referred to herein as "interfaces." As shown, a subscriber 120 communicates with the base station 120 via a wireless interface 122, the RAN 102 and the CN 104 are in communication via a different interface 108, and the CN 104 and external packet switched network 106 are in communication via another interface 110. In some embodiments, the exemplary mobile network 100 utilizes a 3G/UMTS architecture, wherein the base stations 112 represents a "NodeBs," the wireless interface 122 represents a "Uu" interface, the interface 108 represents a "IuPS" and/or a "IuCS" interface, and the interface 110 represents a "Gi" interface. It should be understood that the concepts and techniques sought to be protected herein are applicable to other mobile network architectures, including 4G/LTE.

The exemplary CN 104 includes a serving node 116 and a gateway node 118. In general, the CN 104 provides mobility management, session management, and transport for internet protocol (IP) services. The gateway node 118 is responsible for providing inter-networking between the RAN 102 and the external packet switched network 106. The serving node 116 is responsible for the delivery of data packets (e.g., IP packets) to and from the RAN within its geographic service area. The serving node 116 is responsible for packet routing and transfer, mobility management (e.g., subscriber attach/detach and location management), logical link management, and authentication. The CN 104 may also be responsible tunnel data packets from to/from GPRS using, for example, the GPRS tunneling protocol (GTP). For 3G/UTMS networks, the serving node 116 may represent a serving GPRS support node (SGSN) and the gateway node 118 may represent a gateway GPRS support node (GGSN). For 4G/LTE, the serving node 116 may comprise a mobility management entity (MME) which handles control plane functions and a serving gateway (SWO) which handles user plane functions; and the gateway node 118 may comprise a PDN-Gateway (PDN-GW).

The CN 104 also provides support for additional service plane functions, such as data accounting and lawful interception. For example, in 3G networks, data accounting is typically done within a gateway node 118 by tracking data traffic passing through the CN on a per subscriber basis. In some embodiments, the CN 104 also includes a billing server (not shown) to manage pre-paid as well as post-paid billing. In addition, lawful interception is also typically performed within the CN, either at the serving node 116 or the gateway node 118.

In the exemplary embodiment shown, the CN 104 also includes a content filtering system 126, such as an Internet content filter (ICF). The content filtering system 126 can be used by the network operator to prevent access to certain content on a per subscriber basis. For example, the filtering system may categorize web sites as child-safe, gambling, adult content, etc. and a subscriber may be authorized or not authorized to view certain categories. Because the caching module 124 sends a header request (e.g., an HTTP HEAD request) to the origin server and validates the header response before returning cached content, existing content filtering systems can function correctly without modification. The content filtering system 126 can use any suitable filtering technique, including blacklisting, static content filtering, and/or dynamic content filter.

The exemplary network 100 also includes a caching module 124, generally located at the interface 108 to intercept content requests between the RAN 102 and the CN 104. In some embodiments, the caching module 124 is part of the RNC 114 or, the case of 4G/LTE, is part of the eNodeB; alternatively, the caching module 124 is a standalone system collocated with the RNC and/or the base station 112. It will be appreciated that the caching module 124 can provide transparent caching functionality within the RAN 102 without needing to modify existing components of the mobile network 100.

In general operation, a subscriber 120 generates a content request addressed to an origin server located within the external packet switched network 106. This may be an HTTP GET request generated, for example, in response to a user accessing a web page within a mobile web browser. The subscriber 120 wirelessly transmits the content request to a base station 112. In some embodiments, the content request is transported as a plurality of IP packets encapsulated using GTP. The base station 112, in turn, transmits the HTTP request to a RAN 102.

Caching module 124 can intercept the content request and make an intelligent caching decision. Generally, the caching module 124 can decide to handle the request locally, to forward the request to origin server (via the CN 104), or perform some combination thereof. This decision may be based, for example, on the state of the cache, the type of content requested, other characteristics of the content request (e.g., the type of URL), overall RAN conditions, characteristics of the subscriber (i.e., a user device), and/or network performance relative to the subscriber. An exemplary method for use within the caching module 124 is shown in FIG. 2 and described below in conjunction therewith.

If the caching module 124 decides to forward the request, the content request is received by CN 104, which extracts the IP packets from the encapsulated radio tunneling (e.g., GTP) and forwards the request (in the form of IP packets) into the packet switched network 106 to be received by the origin server. In some embodiments, a content filter 126 may block the content request before it is forwarded to the origin server. The origin server returns a content response, which follows a reverse path through the network. As the response traverses the CN 104, the gateway node 118 can perform data accounting. As the response traverses the RAN 102, the caching module 124 can cache the content.

It should be understood that the exemplary mobile network can include other components and interfaces which, for simplicity of explanation, are not shown in FIG. 1.

Figure 2:
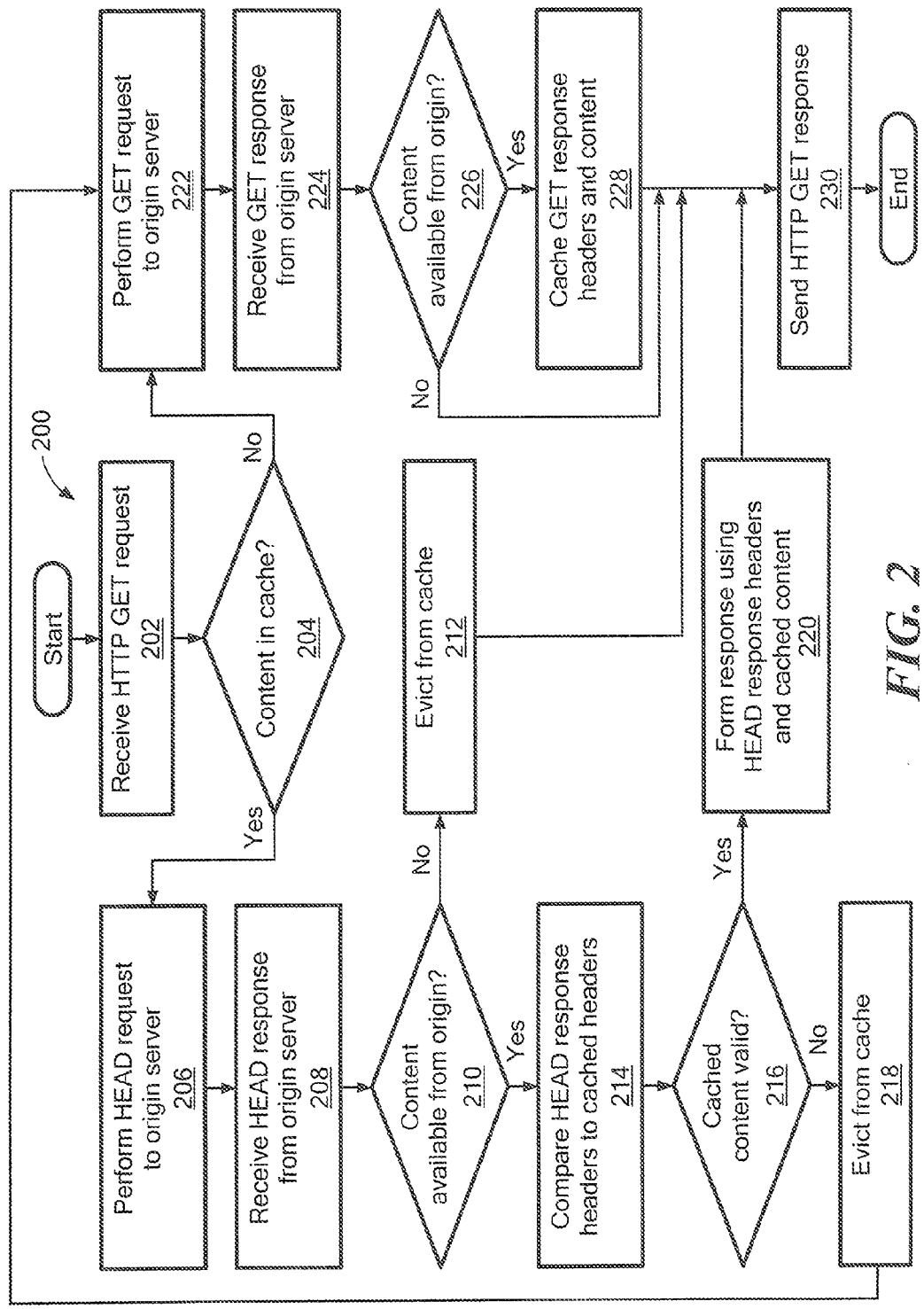
FIG. 2 is a flowchart of an exemplary method for use in the network of FIG. 1.

FIG. 2 is a flowchart corresponding to the below contemplated technique which can be implemented in a caching module (e.g., the caching module 124 shown in FIG. 1). Rectangular elements (typified by element 202 in FIG. 2), herein denoted "processing blocks," represent computer software instructions or groups of instructions. Diamond shaped elements (typified by element 204 in FIG. 2), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagram does not depict the syntax of any particular programming language, but rather illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the systems and methods sought to be protected herein. Thus, unless otherwise stated the blocks described below are unordered meaning that, when possible, the functions represented by the blocks can be performed in any convenient or desirable order.

Referring now to FIG. 2, an exemplary method 200 begins at block 202, where a request for content is received. The content request originates from a mobile subscriber and is destined for a server (referred to as the "origin server") within a packet switched network (e.g. the Internet). Thus, block 202 may represent the caching module 124 intercepting a content request as it traverses the interface 110. In some embodiments, only HTTP GET requests are intercepted. The content request includes a resource locator (e.g., a URL path) that uniquely identifies the requested content within the origin server.

At decision block 204, it is determined if the requested content is available in the caching module. This can be done, for example, using the resource locator to index into memory where cached content is stored. Any suitable technique can be used to determine if the requested content is available locally. If the requested content is available in the caching module, processing continues at block 206; otherwise, processing proceeds to block 222. In some embodiments, block 206 is performed unconditionally (i.e., a header request is always made regardless of the state of the content cache).

At processing block 206, a header request is generated and sent to the origin server to determine if the cached content is valid. The header request includes the resource locator present in the content request. In some embodiments, the header request is an HTTP HEAD request. Next, at processing block 208, a header response is received from the origin server. At decision block 210, it is determined whether the requested content is available at the origin server. This determination can be based on any information within the header response. For HTTP responses, an origin server will typically use a status code between 400 and 499 to indicate content is unavailable. If the content is not available at the origin server, the cached content is deemed invalid and, at processing block 212, the cached content is evicted from the cache (i.e., removed from the caching modules memory).

Otherwise, if the content is available at the origin server, processing will proceed to blocks 214, 216, where some of the headers present in the header response are compared against information (e.g., header values) associated with the cached content to determine if the cached content is valid. In some embodiments, each piece of content cached is stored in the caching module along with a corresponding set of cached headers. One or more of the cached headers are compared with the headers present in the header response. For example, if the cached content "Last-Modified" header value is different from the header response "Last-Modified" header value, the cached content is deemed invalid. Likewise, the cached content is considered invalid if the header response does not include a "Status" header value "200." In some embodiments, the cached content is deemed invalid unless substantially all of the cached headers are identical to the corresponding headers present in the header response, excluding transient headers such as the "Date" HTTP header.

If the cached content is determined to be valid, a content response can be formed at processing block 220 using the cached content. In some embodiments, the response is an HTTP response formed by combining (e.g., grafting or otherwise incorporating) the headers from the header response from the origin server with the cached content (i.e., the body). Otherwise, if the cached content is invalid, it is evicted from the cache at processing block 218 and processing proceeds at block 222.

At processing block 222, the requested content is not available in the cache and, therefore, the content is requested from the origin server. In one embodiment, the intercepted content request (e.g., an HTTP GET request) is forwarded to the origin server. Next, at processing block 224, a response is received from the origin server. At decision block 226, it is determined whether the requested content is available at the origin server, as discussed above in connection with decision block 210. If the origin server returns the requested content, the content and the corresponding response headers can be stored in the cache. In some embodiments, processing block 228 is conditional on the cache control response headers (e.g., the "Cache-Control" and "Expires" HTTP headers).

At processing block 230, a content response is sent to the subscriber. The content response may include previously cached content (i.e., from block 220), newly cached content (i.e., from block 228), or no content at all (i.e., from block 212 or 226).

It should be appreciated that method 200 uses a strategy of always going back to the origin server to obtain the most recent headers, thus providing the benefits of RAN caching without disrupting the service plane. In particular, the CN 104 can continue to perform accurate data accounting by inspecting the header responses (e.g., using the HTTP "Content-Length" header); a content filtering system can determine if the subscriber is authorized to access the content using information the header request and returning an appropriate response (e.g., returning HTTP "Status" of 404); and lawful interception can be performed by monitoring the header requests.

It should be understood that the exemplary method 200 is merely one policy/strategy that can be used within the caching module 124. In some embodiments, the caching module 124 can use the method 200 in combination with other caching strategies. For example, least-recently-used (LRU) eviction policy may be used to ensure faster delivery of popular content to subscribers. Moreover, the caching policies can be dynamically adjusted based on real-time network conditions, mobility information, session attributes, etc.

It should be appreciated that the caching module 124 can make intelligent traffic and content decisions without requiring integration with existing network elements over proprietary or special purpose interfaces. By reducing existing interfaces to gather user and network information, the operator can manage traffic at this important intersection point, improving improved user experience and efficiently using the operator's network assets. As a passive entity on interface 110 between the RAN and the CN, the caching module 124 has access to multiple sources of information at the RAN and content layer natively, without requiring complex integration with gateway support nodes, content filtering systems, and other network elements. As a result, the caching system 124 has built-in awareness of device type, user network conditions, content and application type, and RAN conditions. In addition, the cache's proximity to the RAN allows it to accurately and quickly detect RAN and RF conditions (as well as CN conditions) at the content layer based on real-time computation of the UE's aggregate throughput for a particular content flow.

It should be appreciated that a resource locator (e.g. a URL) may correspond to dynamic content, such that requesting the same URL from an origin server may return different content. Ideally, the origin server will return different headers in this case (e.g. by varying the "Last-Modified" header value), however some servers may fail to update the headers. Thus, in some embodiments, the caching module may make an HTTP GET request instead of (or in addition to) an HTTP HEAD request. The caching module may wait for the HTTP GET response and compare the response body to cached content; if the response content and the cached content are not identical, the caching module invalidates the cached content. For reasons of efficiency, the caching module may request a predetermined number of bytes of content and, for example, send a Transmission Control Protocol (TCP) disconnect request back to the origin server after that number of bytes is received.

Figure 3:
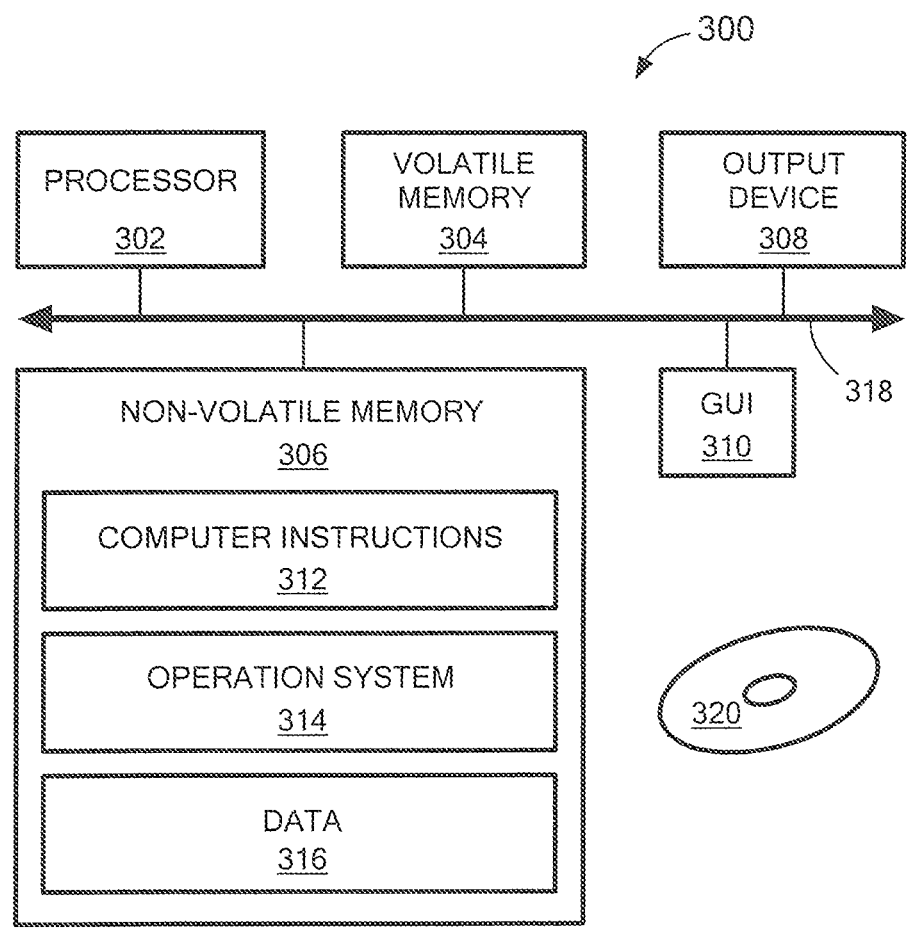
FIG. 3 is a schematic representation of an exemplary computer for use with the network of FIG. 1.

FIG. 3 shows an exemplary computer or other processing device 300 that can perform at least part of the processing described herein. The computer 300 includes a processor 302, a volatile memory 304, a non-volatile memory 306 (e.g., hard disk), an output device 308 and a graphical user interface (GUI) 310 (e.g., a mouse, a keyboard, a display, for example), each of which is coupled together by a bus 318. The non-volatile memory 306 stores computer instructions 312, an operating system 314, and data 316. In one example, the computer instructions 312 are executed by the processor 302 out of volatile memory 304. In one embodiment, an article 320 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of; data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

All references cited herein are hereby incorporated herein by reference in their entirety.

Having described exemplary embodiments, which serve to illustrate various concepts, structures and techniques sought to be protected herein, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A computer implemented method comprising:
receiving, in a caching module disposed at an interface between a radio access network (RAN) and a core network (CN), a content request to retrieve content from an origin server;
determining if the requested content is available in the caching module as cached content;
sending a header request from the caching module to the origin server in response to receiving the content request, the header request comprising an HTTP HEAD request;
receiving at the caching module, in response to sending the header request, a header response comprising one or more headers, wherein a header present in the header response corresponds to a size of the requested content;
in response to the header response traversing a gateway in the CN, the gateway can use the size of the content to account for a content size that will be delivered from the caching module once the header response is received by the caching module;
determining if the requested content is available at the origin server using the one or more headers;
determining if the cached content is valid by comparing information associated with the cached content with the one or more headers;
if the requested content is available at the origin server and if the cached content is valid, sending a content response comprising the cached content,
if the requested content is not available at the origin server, removing the cached content from the caching module, and
if the requested content is available at the origin server and the cached content is not valid, removing the cached content from the caching module, retrieving valid content from the origin server, storing the valid content in the caching module, and sending a content response comprising the retrieved valid content.

2. The method of claim 1 wherein the content request comprises a resource locator to identify the requested content, wherein the header request comprises the resource locator, the method further comprising using the resource locator to determine if the content is available in the caching module as cached content.

3. The method of claim 1 further comprising in response to the cached content being valid, combining one or more headers present in the header response with the cached content to form the content response.

4. The method of claim 1 wherein the content request is an HTTP GET request and the header request is an HTTP HEAD request.

5. The method of claim 4 wherein determining whether the cached content is valid includes determining if the header response comprises an HTTP status code greater than or equal to 400 and less than 500.

6. The method of claim 1 wherein the header response indicates whether a user is authorized to access the requested content, wherein in response to a user not being authorized to access the requested content, the caching module does not provide the requested content.

7. The method of claim 6 wherein the header response traverses a content filtering system to determine if the user is authorized to access the requested content.

8. The method of claim 1 wherein the header response includes information to allow the lawful interception as the header response traverse the CN, to monitor content requests initiated by a user over a predetermined time period.

9. The method of claim 1 wherein the caching module is collocated with a cellular base transceiver station or a controller controlling multiple base transceiver stations.

10. The method of claim 1 wherein determining whether the cached content is valid comprises comparing a "Last-Modified" header value in the header response to a modification timestamp associated with the cached content.

11. A computer system disposed at an interface between a radio access network (RAN) and a core network (CN), the computer system comprising:
a memory to store cached content;
a caching module coupled to the memory, the caching module configured to:
receive a content request to retrieve content from an origin server;
determine if the requested content is available in the memory as cached content;
send a header request to the origin server in response to receiving the content request, the header request comprising an HTTP HEAD request;
in response to sending the header request, receive a header response comprising one or more headers, wherein a header present in the header response corresponds to a size of the requested content;
in response to the header response traversing a gateway in the CN, the gateway can use the size of the content to account for a content size that will be delivered from the caching module once the header response is received;

determine if the requested content is available at the origin server using the one or more headers;

determine if the cached content is valid by comparing information associated with the cached content with the one ore more headers;

if the requested content is available at the origin server and if the cached content is valid, provide the requested content from the memory;

if the requested content is not available at the origin server, remove the cached content from the caching module; and if the requested content is available at the origin server and if the cached content is not valid, remove the cached content from the memory, retrieve valid content from the origin server, store the valid content in the memory, and send a content response comprising the retrieved valid content.

12. The system of claim 11 wherein the content request comprises a resource locator to identify the requested content, wherein the header request comprises the resource locator, wherein the caching module is further configured to use the resource locator to determine if the content is available in the memory as cached content.

13. The system of claim 11 further comprising in response to the cached content being valid, combining one or more headers present in the header response with the cached content to form the content response.

14. The system of claim 11 wherein the content request is an HTTP GET request and the header request is an HTTP HEAD request.

15. The system of claim 14 wherein the caching module is configured to determine whether the cached content is valid by at least determining if the header response comprises an HTTP status code greater than or equal to 400 and less than 500.

16. The system of claim 11 wherein the header response indicates whether a user is authorized to access the requested content, wherein in response to a user not being authorized to access the requested content, the caching module does not provide the requested content.

17. The system of claim 16 wherein the header response traverses a content filtering system to determine if the user is authorized to access the requested content.

18. The system of claim 11 wherein the header response includes information to allow the lawful interception as the header response traverse the CN, to monitor content requests initiated by a user over a predetermined time period.

19. The system of claim 11 wherein the caching module is collocated with a cellular base transceiver station or a controller controlling multiple base transceiver stations.

20. The system of claim 11 wherein the caching module is configured to determine whether the cached content is valid by at least comparing a "Last-Modified" header value in the header response to a modification timestamp associated with the cached content.

* * * * *